Oct. 23, 1934.  H. B. AUGUSTINE  1,978,335
INTERNAL COMBUSTION ENGINE
Filed June 14, 1934  3 Sheets-Sheet 1
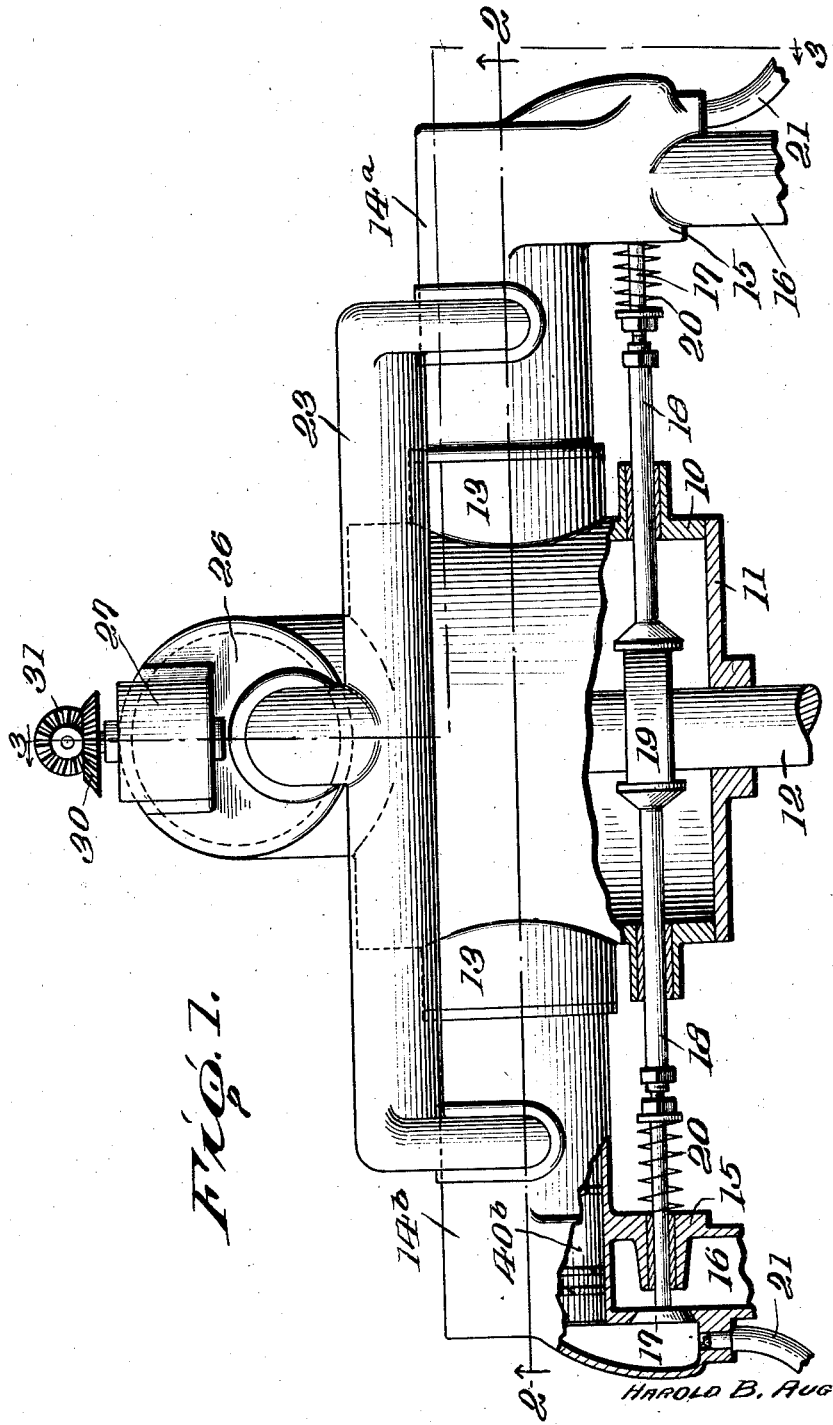
Inventor
HAROLD B. AUGUSTINE
By Sturtevant Mason
Attorneys

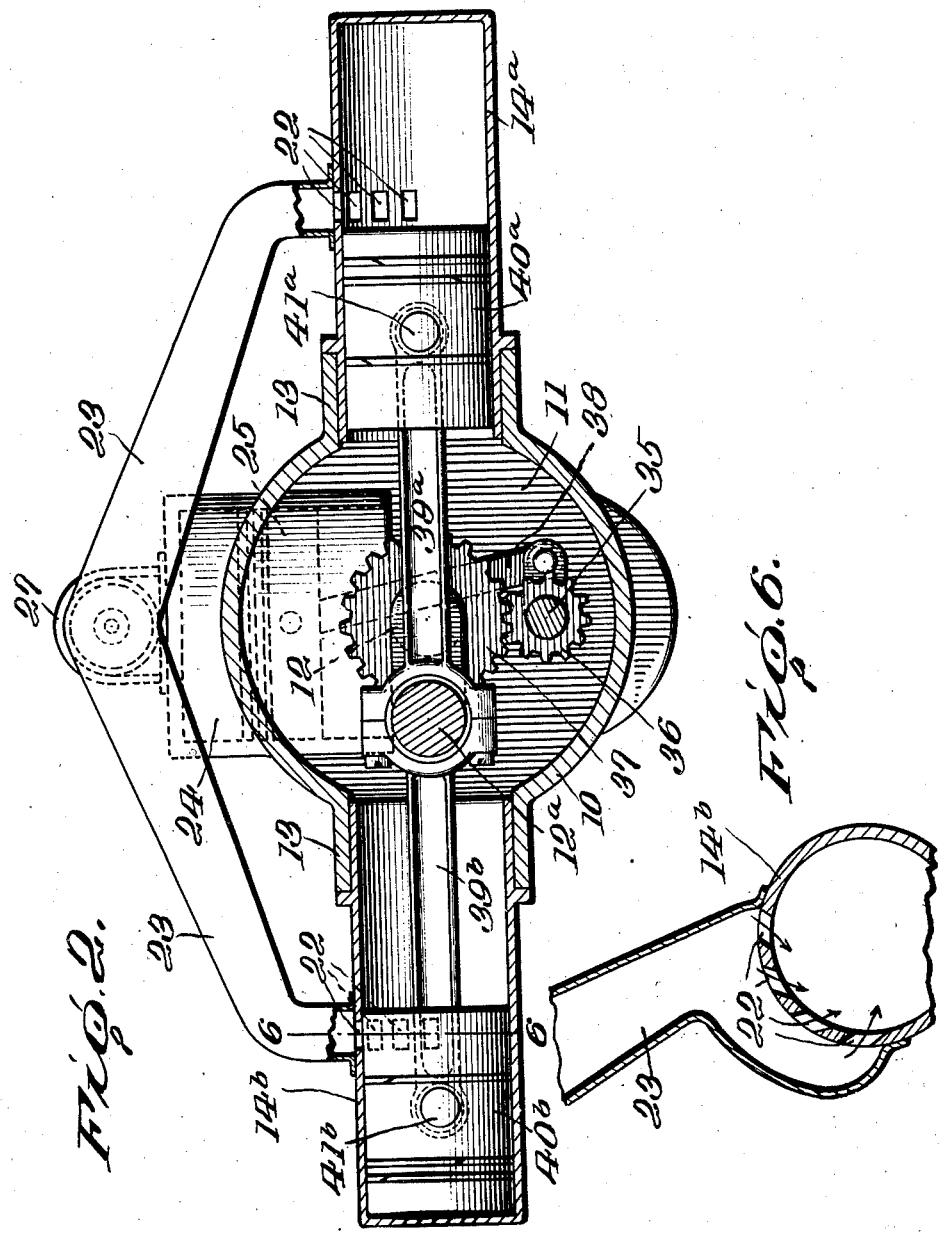

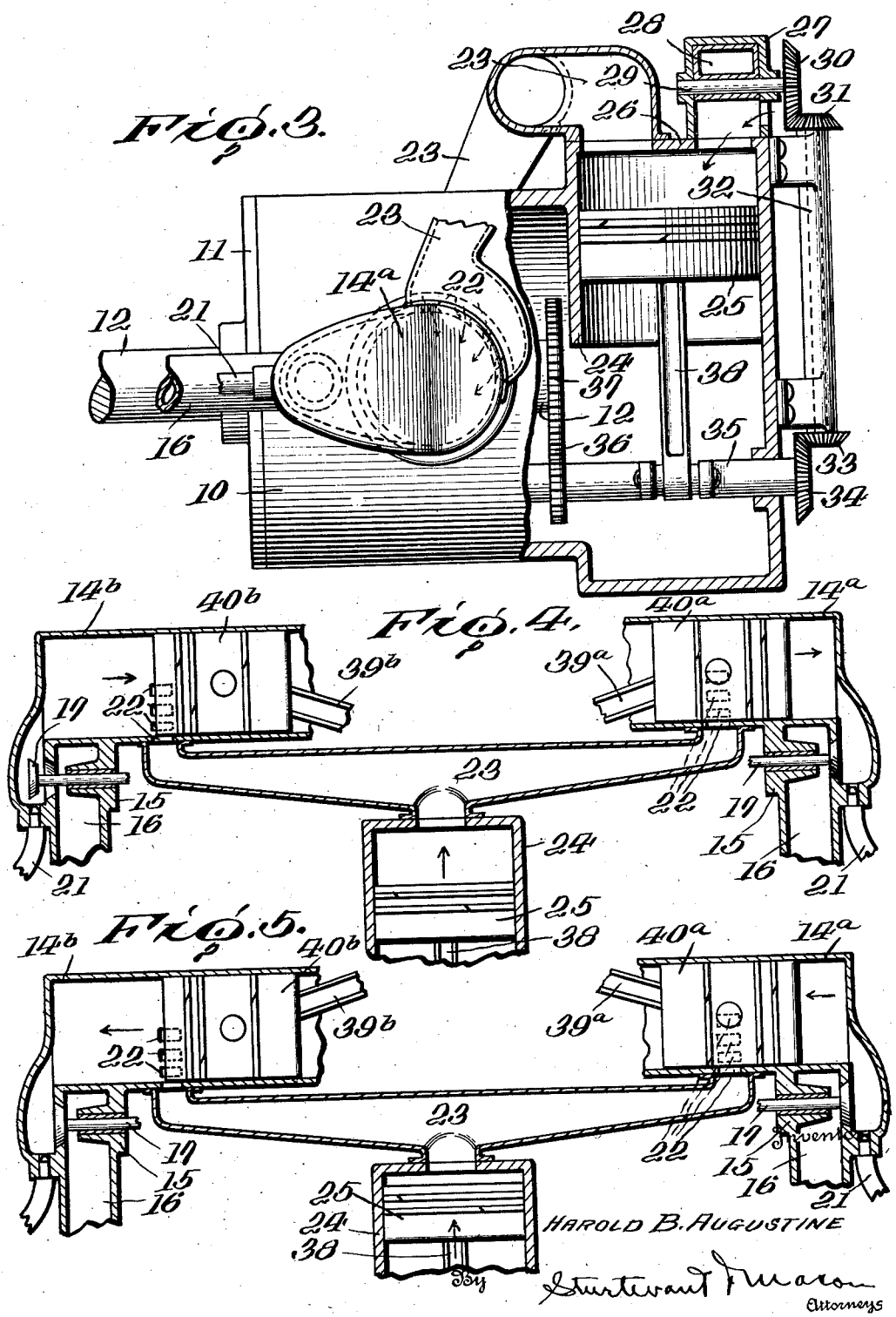

Patented Oct. 23, 1934

1,978,335

UNITED STATES PATENT OFFICE 1,978,335

INTERNAL COMBUSTION ENGINE

Harold B. Augustine, Kenmore, N. Y., assignor to Harold B. Augustine, trustee of the Uniflow Syndicate, Buffalo, N. Y., a copartnership Application June 14, 1934, Serial No. 730,645

13 Claims. (Cl. 123—56)

The invention relates to new and useful improvements in an explosion engine, and more particularly to a two-cycle internal combustion engine.

An object of the invention is to provide an internal combustion engine of the above type which has a relatively great amount of power in proportion to its weight and a high volumetric efficiency for a given cylinder dimension, and wherein in the combustible charge in the cylinder is of such quality that the greatest possible amount of power is obtained from the combustion thereof.

A further object of the invention is to provide an explosion engine of the above type which is of light weight and of few moving parts, and wherein means is provided for scavenging the cylinder with air introduced into said cylinder at substantially atmospheric pressure.

A further object of the invention is to provide an explosion engine of the above type wherein air is furnished the engine cylinder by a reciprocating pump piston which delivers air at low pressure and high velocity to the cylinder.

Another object is to provide an engine of the above type wherein the cylinders are arranged in pairs operating in succession, and a single reciprocating piston pump operating at twice engine speed furnishes first one cylinder and then the other with air at substantially atmospheric pressure.

Another object of the present invention is to provide an explosion engine of the above type wherein the exhaust port is closed prior to the closing of the intake port, whereby the pump may be utilized for supercharging the cylinder with air.

With these and other objects in view as will appear in the course of the following specification and claims, an illustrative embodiment of the invention is shown in the drawings, in which:

Figure 1 is a plan view, with parts broken away, of an explosion engine according to the present invention.

Figure 2 is a longitudinal sectional view of the same, substantially on line 2—2 of Figure 1.

Figure 3 is a transverse sectional view substantially on line 3—3 of Figure 1.

Figures 4 and 5 are diagrams showing the course of operation of the engine.

Figure 6 is a detail sectional view substantially on line 6—6 of Figure 2.

The invention has to do with an internal combustion engine of the two-cycle Diesel type. It includes a crank casing in which a crank is mounted for rotation, a plurality of cylinders connected to said crank casing, each of which is provided with a piston connected in the usual manner by a piston rod to a crank in the crank shaft. Each cylinder is provided with air intake ports which are controlled by the piston and an exhaust port at the outer end of the cylinder and having a valve for controlling the same. The cylinders are preferably arranged in pairs operating in succession, and associated with each pair of cylinders is a pumping mechanism which includes a pump chamber and a pump piston operating at twice engine speed. The pump piston is so timed relative to the uncovering of the intake ports that little or no pressure accumulates in the pump chamber and air is delivered through the intake ports into the cylinder substantially at atmospheric pressure. It is preferably delivered into the cylinder through tangentially arranged ports so that through the swirling motion the air will lift the burnt gases and completely scavenge the cylinder, as the burnt gases are forced out through the open exhaust port. The pump is so dimensioned as to supply a volume of air which will overrun the cylinder to a slight extent, thus completely scavenging the same. The exhaust valve is so timed as to close before the intake ports so that the pump will continue to supply air, thus producing a supercharge of fresh air. The fuel is injected into the combustion chamber in the usual manner and thoroughly mixed with the air, thus producing the explosive charge. The exhaust valve opens on the working stroke of the piston so as to release the cylinder to the atmosphere prior to the opening of the intake ports. The pump is associated with both cylinders in a pair and supplies first one cylinder and then the other with air.

Referring more in detail to the drawings, the illustrated embodiment of the invention is shown wherein there are a pair of cylinders attached to a crank casing. It is understood, however, that there may be any number of pairs of cylinders of course within reason, but only one pair has been shown to illustrate the principle of the invention. The crank casing is indicated at 10. Said crank casing has offset connections 13 supporting cylinder blocks 14a and 14b of a pair of cylinders. These cylinders are mounted in diametrically opposed relation at opposite sides of the main shaft 12. Each of these cylinder blocks is provided with an offset extension 15 providing a passage 16 leading to a point of discharge for the exhaust gases. The exhaust valve 17 of each cylinder operates to shut off communication between the cylinder space proper and the passage 16 at times which are determined and controlled by the operation of the valve tappet rod 18 which is reciprocated by a cam 19 fixed on the main shaft 12. A usual type of valve spring 20 is indicated as operating to seat the valve in closed position.

Adjacent the exhaust valve, each cylinder is also provided with a fuel feeding device 21 of any appropriate type. This feeding device is well known in the art and as its specific construction and operation constitute no part of the present invention, it is shown in diagrammatic form.

Opening into the cylinder space of each cylinder block 14a, 14b are a plurality of tangentially directed ports 22 (Figure 6) for admitting a fresh charge of air into the corresponding cylinder. These ports are in communication with a manifold pipe 23 which communicates with the clearance space of a pumping mechanism. This pumping mechanism is shown in Figure 3 as comprising a cylinder 24 and a piston 25 movable therein. The end of the cylinder is closed by a wall 26 except for the communication into the intake manifold 23 and a communication leading into the housing 26 of a rotary valve 28 which is fixed to a valve shaft 29. The valve shaft 29 carries a bevel gear 30 externally of the valve housing 27 in mesh with a bevel gear 31 on a shaft 32 journaled in a bracket structure supported on the pump wall. The lower end of the shaft 32 carries a bevel gear 33 which is in mesh with a bevel gear 34 on the end of a pump crank shaft 35 which is journaled in the end plates 11 of the engine crank case and is provided with a gear 36 which is in mesh with a gear 37 on the main shaft 12 (Figures 2 and 3). The pump crank shaft 35 has an offset or eccentric pin engaged with the end of the pump connecting rod 38 which operates to move the pump piston 25 back and forth.

As shown in Figure 2, the crank pin 12a of the main shaft 12 engages a pair of connecting rods 39a, 39b which are connected to the corresponding pistons 40a, 40b by the piston pins 41a, 41b in the usual way. The pistons 40a and 40b move back and forth in the corresponding cylinder blocks 14a and 14b operating during predetermined portions of their strokes to cover and then uncover the ports 22.

The principles involved in the invention will be better understood by a description of the operation of the engine. As noted, the engine is a two-cycle Diesel engine in which the charge is compressed and exploded for each reciprocation of the piston. Fresh air is admitted through the inlet manifold 23 and at ports 22 and fuel is admitted through the injection of the fuel supplying device 21 in proper timed relation during each cycle of reciprocation of the piston.

If it be assumed that the engine is just beginning a cycle with the left-hand piston 40b at the dead center of its leftward or compression movement, the continued rotation of the main shaft 12 by inertia will carry the crank pin 12a past dead center so that the piston 40b will be moved toward the right in Figure 2, under the action of the expanding gases, to drive the main shaft 12 in the usual way. This action continues until the head end of the piston 40b approaches the inlet ports 22 of the corresponding cylinder block 14b. At this time the cam 19 operates to open the exhaust valve 17 so that the expanding gases are discharged to the exhaust passage 16 of the corresponding cylinder, and the pressure within the cylinder 14b drops rapidly toward atmospheric. During this time, the piston 40b has been maintaining the corresponding ports 22 closed. Shortly thereafter the piston 40b uncovers the corresponding ports 22 (position of Figure 4) as the piston continues to move toward the right. At this time, the pressure within the cylinder block 14b is close to atmospheric, and the cylinder space is full of combustion gases.

The pump piston 25 has now reached the bottom of its stroke and is just beginning to move upward (Figure 3) to discharge air therefrom. It will be noted, however, that the ports and passages for the intake manifold are very large in section and hence the air moves freely at low pressure and increasing velocity into the cylinder block 14b, entering tangentially and provoking a swirling action adjacent the top of the piston and thus bodily displacing the combustion gases and forcing them past the exhaust valve 17 which remains open. The piston 40b continues in its movement toward the right until its crank pin 12a reaches the other dead center in the usual way. Thereupon, the piston 40a in cylinder block 14a comes into action in similar manner to advance the main shaft 12 through a further angle of 180 degrees.

During this further movement of the main shaft 12, it operates to push the piston 14b back to the position of Figure 2. During the first part of this movement, the piston 40b still leaves the port 22 uncovered. The speed of movement of the pump shaft 35 is substantially twice that of the main shaft 12, as the gear 37 has twice the number of teeth as gear 36. Hence the pump piston 25 moves away from its bottom center at an accelerating rate, and preferably reaches top center at substantially the instant that the ports 22 are again closed by piston 40b (position of Figure 5). It is preferred to close the exhaust valve 17 prior to this time, and it is also preferred to so calculate the size of the diameter of the pump cylinder 24 and the stroke of the pump piston 25 that about five percent of the incoming fresh air is discharged past the exhaust valve 17 before this valve closes, in order, to assure a thorough scavenging of the cylinder space.

The rotary valve 28 is so timed through its driving mechanism that it is closed while the piston 25 is moving upwardly in Figure 3, but opens and admits air in the direction of the arrow during the downward movement of the piston 25.

It will be understood that fuel injection with a Diesel type engine is accomplished through the fuel feeding device 21 which is diagrammatically represented at an appropriate point of movement of the corresponding piston. The pumping mechanism and the exhaust valve 17 are likewise preferably coordinated so that a supercharge of air is delivered into the cylinder before its ports 22 are closed by the corresponding piston. The free and substantially unobstructed flow permitted the incoming air when the ports 22 are uncovered, and the swirling motion of the air as it enters the cylinder, prevents any substantial mixing of the fresh air with the combustion gases of the prior charge and hence the scavenging is complete, there being substantially no pressure differential between the fresh air and the combustion gases at the moment that the fresh air begins to enter the cylinder.

The pump piston moves at twice engine speed and supplies first one cylinder and then the other. This enables a large volume of air to be delivered to the engine casing at a relatively low pressure and during a comparatively short angle of movement of the piston which controls the intake ports. Through this arrangement of pumping means for delivering air to the cylinder, a sufficient volume of air may be delivered to the cylinder to cause a complete scavenging of the gases and a slight overrunning of the air. As noted above, the exhaust valve closes prior to the closing of the intake ports so that the pump will deliver a supercharge of air to the cylinder.

It is obvious that many changes may be made in the arrangement of the cylinders, the arrangement of the intake and exhaust ports, and the arrangement of the pumping mechanism without departing from the spirit of the invention as set forth in the appended claims. The arrangement of the cylinders in pairs opposed to each other is however preferable as both piston rods are connected to the same crank and thus the operating parts reduced to a minimum. This also enables the engine to be constructed of relatively light weight and which is strong and durable. This produces a power unit which is especially adapted for airplane work. It is understood, however, that the engine is equally adaptable for other uses, as the complete scavenging of the cylinders not only produces a light engine which has great efficiency, but it also produces an engine of the Diesel type wherein there is little or no smoke discharged with the exhaust gases.

Having thus described the invention, what I claim as new and desire to secure by Letters Patent, is:

1. A two-cycle internal combustion engine including a cylinder, a piston reciprocating therein, intake and exhaust ports, one of said ports being located at the inner end of the cylinder and being controlled by the piston and the other being disposed at the outer end of the cylinder and a valve for controlling the same, and means for supplying air through the intake ports to the cylinder including a piston pump operating to deliver air to the cylinder substantially at atmospheric pressure during the scavenging period and in sufficient volume to completely scavenge the cylinder.

2. A two-cycle internal combustion engine including a cylinder, a piston reciprocating therein, intake and exhaust ports, one of said ports being located at the inner end of the cylinder and being controlled by the piston and the other being disposed at the outer end of the cylinder and a valve for controlling the same, and means for supplying air through the intake ports to the cylinder including a piston pump operating to deliver air to the cylinder substantially at atmospheric pressure during the scavenging period and in sufficient volume to completely scavenge the cylinder, said valve for the exhaust port being closed prior to the closing of the intake port whereby a supercharge of air is delivered to the cylinder by said pump.

3. A two-cycle internal combustion engine including a pair of cylinders, a piston in each cylinder, said pistons operating alternately to compress and explode the charge, intake ports in each cylinder controlled by the piston therein, an exhaust port at the outer end of each cylinder, a valve for controlling the exhaust port, a pump including a reciprocating piston for supplying air alternately to said cylinders, said pump being operated at twice the engine speed and being timed so as to deliver air to the cylinder at substantially atmospheric pressure during the scavenging period and in sufficient volume to completely scavenge the cylinder and overrun the exhaust port.

4. A two-cycle internal combustion engine including a pair of cylinders, a piston in each cylinder, said pistons operating alternately to compress and explode the charge, intake ports in each cylinder controlled by the piston therein, an exhaust port at the outer end of each cylinder, a valve for controlling the exhaust port, a pump including a reciprocating piston for supplying air alternately to said cylinders, said pump being operated at twice the engine speed and being timed so as to deliver air to the cylinder at substantially atmospheric pressure during the scavenging period and in sufficient volume to completely scavenge the cylinder and overrun the exhaust port said valves for the exhaust ports being closed prior to the closing of the intake ports whereby a supercharge of air is delivered to each cylinder by said pump.

5. A two-cycle internal combustion engine including in combination a crank shaft, a pair of cylinders, pistons associated therewith connected to the crank shaft and having alternate power strokes, ports in each cylinder at the inner end of the combustion chamber, said pistons operating to control said ports, a port at the outer end of each cylinder and valve means operated from said crank shaft for controlling said ports, a pumping mechanism for feeding air through one of said ports to one of said combustion chambers for scavenging the chamber and supplying the same with air, and means for charging said air within the cylinder with fuel, said air supplying means being constructed and timed so as to supply air initially to the combustion chamber at substantially atmospheric pressure during the scavenging period and in a continuing volume to completely scavenge said combustion chamber.

6. A two-cycle internal combustion engine as in claim 5, in which the exhaust port of each cylinder is closed after the said pumping mechanism has delivered air in such quantity as to overrun and flow through the exhaust valve.

7. A two-cycle internal combustion engine as in claim 5, in which the exhaust port is closed prior to the closing of the intake port and while said pumping mechanism is continuing to deliver air into said combustion chamber, whereby air under pressure is supplied to the cylinder prior to the closing of the intake port.

8. A two-cycle internal combustion engine including in combination a crank shaft, a pump shaft, a speed multiplying gearing between said crank shaft and pump shaft, a plurality of power cylinders and pistons associated therewith, said pistons being connected to said crank shaft and having successive power strokes, intake ports in each cylinder at the inner end of the combustion chamber, said pistons operating to uncover said ports near the end of the expansion stroke and to close said ports during the course of the compression stroke, an exhaust port at the outer end of each cylinder, exhaust valve means operated from said crank shaft for controlling said exhaust ports, a pump cylinder, a pump piston operated from said pump shaft, an air conduit from said pump cylinder to the intake ports of all said power cylinders whereby the pistons of the power cylinders operate as valves for controlling the movement of air through said conduit, and a valve for controlling the intake of air to said pump cylinder, said pump piston being so timed with relation to the movement of the power pistons that air is delivered through said intake ports initially at substantially atmospheric pressure when said ports are uncovered by the corresponding power piston and whereby the air is delivered therethrough while the exhaust valve is held open for scavenging the corresponding cylinder, and thereafter operating to create a superatmospheric pressure of air in the cylinder for compression by the power piston during its compression stroke.

9. A two-cycle internal combustion engine including in combination a crank shaft, a pump shaft, a two-to-one speed increasing gearing connecting said crank shaft and pump shaft, a pair of power cylinders, power pistons associated therewith and connected to the crank shaft to have alternate power strokes, intake ports in each cylinder near the inner end of the combustion chamber thereof, said power pistons operating to control said ports, an exhaust port at the outer end of each cylinder, exhaust valves for controlling said exhaust ports, a pump cylinder, a pump piston operated by said pump shaft, a conduit connecting said pump cylinder with the ports of all said power cylinders, said pump piston being so timed with relation to the power pistons that it operates to deliver air under substantially atmospheric pressure into each of the power cylinders toward the end of the expansion stroke thereof and continues to deliver air into the power cylinders during the remainder of the expansion stroke and the beginning of the compression stroke for scavenging the power cylinders and supplying a quantity of air under superatmospheric pressure thereto, and means for operating said exhaust valves whereby the valves permit a compression of the fresh air of the cylinder to escape prior to the closure of the exhaust valve.

10. A two-cycle internal combustion engine including a cylinder, a power piston reciprocating therein, intake ports located at the inner end of the cylinder and controlled by the piston, and an exhaust port disposed at the outer end of the cylinder and a valve for controlling the same, means for supplying air to the cylinder through the intake ports including a piston pump, means for operating the pump piston and means for operating the valve for the exhaust port, said power piston, said valve operating means, and said pump being timed so that the exhaust valve is opened prior to the uncovering of the intake ports by the piston, and said piston pump is at the beginning of its transfer stroke when said intake ports are opened.

11. A two-cycle internal combustion engine including a cylinder, a power piston reciprocating therein, intake ports located at the inner end of the cylinder and controlled by the piston, and an exhaust port disposed at the outer end of the cylinder and a valve for controlling the same, means for supplying air to the cylinder through the intake ports including a piston pump, means for operating the pump piston and means for operating the valve for the exhaust port, said power piston, said valve operating means and said pump being timed so that the exhaust valve is opened prior to the uncovering of the intake ports by the piston, and said piston pump is at the beginning of its transfer stroke when said intake ports are opened, and so that said exhaust valve closes before said intake ports are closed and before said pump piston reaches the end of its stroke.

12. A two-cycle internal combustion engine including a pair of cylinders, a piston in each cylinder, said pistons operating alternately to compress and explode the charge, intake ports in each cylinder controlled by the piston therein, an exhaust port at the outer end of each cylinder, a valve for controlling the exhaust port, means for operating said exhaust port and a pump including a reciprocating piston for supplying air alternately to said cylinders, said pump being operated at twice the engine speed, said power pistons and said valve operating means being timed relative to the pump piston so that the exhaust valve is opened prior to uncovering the intake ports on one cylinder to receive a charge from the pump on one air transferring stroke and the exhaust port is opened prior to the opening of the intake port on the other cylinder to receive a charge from the pump on the next air transferring stroke thereof.

13. A two-cycle internal combustion engine including a pair of cylinders, a piston in each cylinder, said pistons operating alternately to compress and explode the charge, intake ports in each cylinder controlled by the piston therein, an exhaust port at the outer end of each cylinder, a valve for controlling the exhaust port, means for operating said exhaust port and a pump including a reciprocating piston for supplying air alternately to said cylinders, said pump being operated at twice the engine speed, said power pistons and said valve operating means being timed relative to the pump piston so that the exhaust valve is opened prior to uncovering the intake ports on one cylinder to receive a charge from the pump on one air transferring stroke and the exhaust port is opened prior to the opening of the intake port on the other cylinder to receive a charge from the pump on the next air transferring stroke thereof, said exhaust valve operating means being timed so as to close the exhaust valves in the respective cylinders prior to the closing of the air intake ports whereby a supercharge of air is delivered to the engine cylinders by said pump.

HAROLD B. AUGUSTINE.